United States Patent

[11] 3,619,032

| [72] | Inventor | Fremont Reizman<br>Wilton, Conn. |
|---|---|---|
| [21] | Appl. No. | 748,517 |
| [22] | Filed | July 29, 1968 |
| [45] | Patented | Nov. 9, 1971 |
| [73] | Assignee | The Perkin-Elmer Corporation |

[54] TEMPORAL LIGHT MODULATOR USING DEFLECTABLE MEMBRANE
7 Claims, 5 Drawing Figs.

[52] U.S. Cl. .................................................. 350/161,
350/269, 350/285
[51] Int. Cl. ....................................................... G02f 1/32
[50] Field of Search........................................... 350/160,
161, 266, 269, 285, 169; 356/209, 211

[56] References Cited
UNITED STATES PATENTS

| 1,525,548 | 2/1925 | Jenkins.................... | 350/161 |
| 1,525,550 | 2/1925 | Jenkins.................... | 350/161 |
| 2,731,878 | 1/1956 | Sherwin.................... | 356/209 |
| 3,479,109 | 11/1969 | Preston, Jr.................... | 350/161 |

*Primary Examiner*—William L. Sikes
*Attorney*—Edward R. Hyde, Jr.

ABSTRACT: A system for modulating the amplitude of a beam of radiant energy which includes a reflective surface, a lens positioned to form a Fraunhofer diffraction pattern of a beam reflected from the surface, and a spatial filter located at the focal point of the lens. Means are provided for moving the reflective surface through a range of positions, so that the intensity at the center of the pattern varies from a maximum to a minimum. The filter is arranged to select only the central region as the output beam.

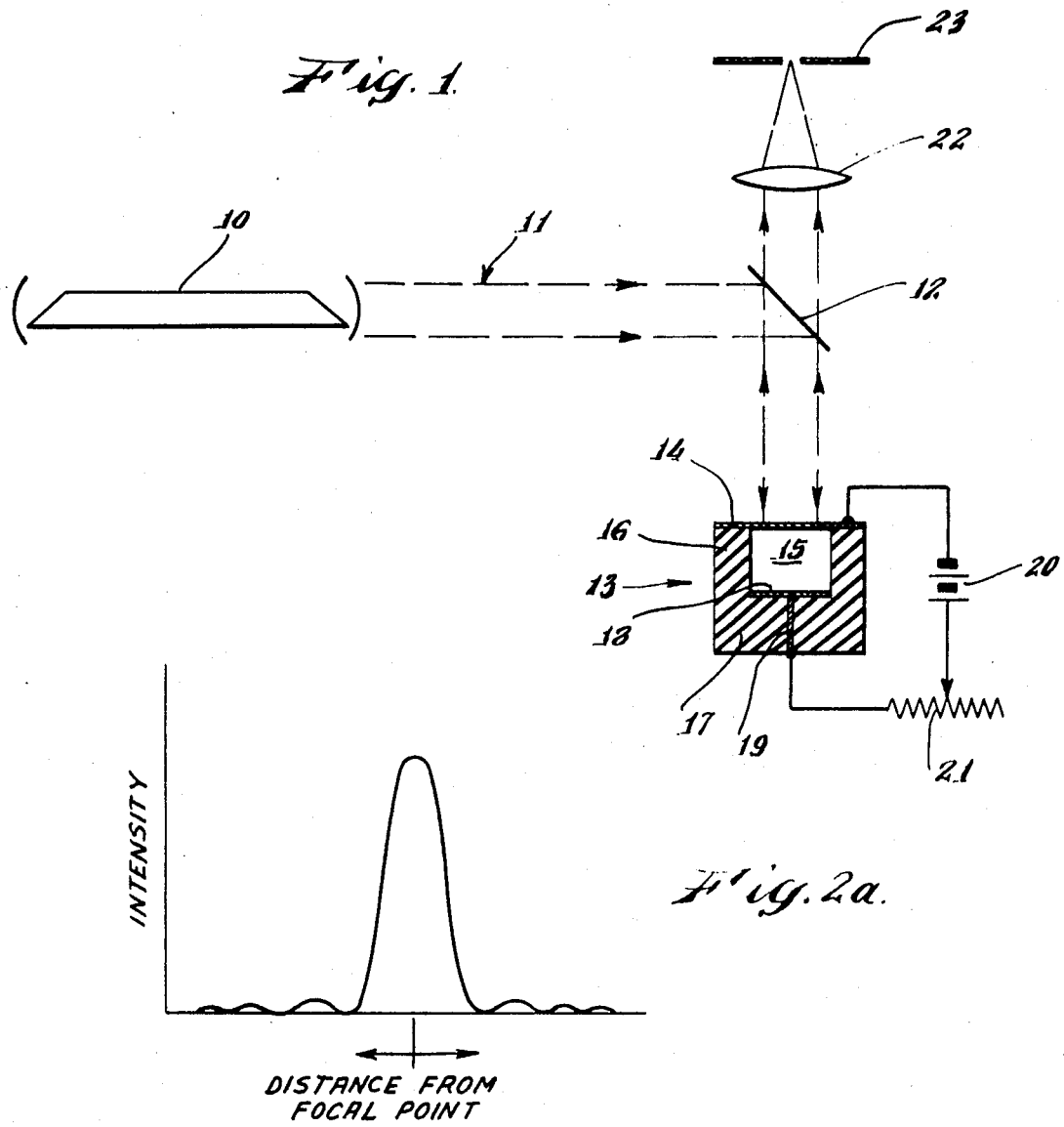
Fig. 1.
Fig. 2a.
Fig. 2b.
INVENTOR.
Fremont Reizman
BY
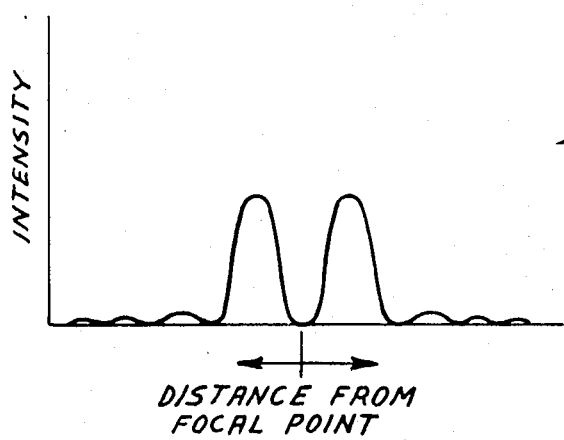
ATTORNEY.

PATENTED NOV 9 1971 3,619,032

INVENTOR.
Fremont Reizman
BY Edward D. Murphy
ATTORNEY.

TEMPORAL LIGHT MODULATOR USING DEFLECTABLE MEMBRANE

This invention relates to a device for modulating the amplitude of a beam of light and in particular relates to a high-frequency device which requires a low-power input.

A variety of systems using radiant energy for information transfer or analysis are, at present, limited by the difficulty of satisfactorily modulating the radiated energy. The available light modulators do not have sufficient capability in one or more respects; for example, in their mechanical ability to reach high frequencies, the percent modulation of which they are capable or the requirement of significant power inputs. The development and utilization of lasers has emphasized the need for a suitable light modulator in such fields as optical communications and optical data-processing systems.

Accordingly it is an object of this invention to provide a new and improved light-modulating system.

Another object of this invention is the provision of a low power, high-frequency light modulator.

A further object of this invention is the provision of a new and improved light modulating means which is capable of producing 100 percent modulation in an output beam.

Further objects and advantages of this invention will become apparent as the description and illustration thereof proceed.

Briefly, in accord with one embodiment of this invention, I provide a system for modulating the amplitude of a beam of radiant energy which includes a reflective surface, a lens positioned to form a Fraunhofer diffraction pattern of a beam reflected from the surface, and a spatial filter located at the focal point of the lens. Means are provided for moving the reflective surface through a range of positions. At one extremity of this range, the elements are so related that a large percentage of the incident light beam is included in the central disc of the diffraction pattern formed by the lens and the spatial filter is positioned to transmit only the center of this disc. The range of positions of the reflective surface also includes a point at which the center of the disc of the diffraction pattern is essentially black. In this position, the spatial filter eliminates the rings of the diffraction pattern and transmits only the dark portion of the central disc.

In accord with a specific feature of this invention, the reflective surface comprises a membrane light modulator of the type described and claimed in two U.S. Patents in the name of Kendall Preston, Jr., No. 3,479,109, Nov. 18, 1969, and No. 3,463,572, Aug. 26, 1969.

In the accompanying drawings:

FIG. 1 is a vertical cross-sectional view of a representative system in accord with this invention;

FIGS. 2a and 2b are representations of the output beam produced by the system of the present invention;

Figure 3:
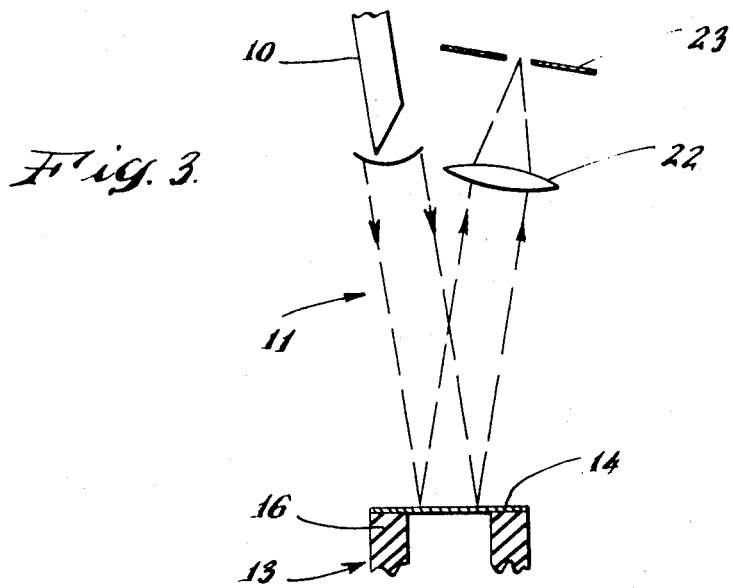
FIG. 3 is a vertical cross-sectional view of a preferred embodiment of this invention.

In FIG. 1, a system incorporating the present invention for modulating a light beam is schematically illustrated. In actual use, the system would, in general, be combined with a variety of other system components for controlling other parameters which are not pertinent to the operation of the present invention; accordingly, such components have not been shown in FIG. 1. For example, an optical-communication system including the present invention might include means for stabilizing the frequency of the light source, collimating means for maximizing the parallelism of the beam, and means for accurately specifying the direction of transmission of the output beam.

FIG. 1 shows simply a source comprising a laser 10 which emits a substantially coherent beam 11 which is to be modulated according to a continuous pattern of information. The beam 11 may be applied to a beam splitter 12 which reflects a substantial portion thereof onto the modulating means 13 of the present invention. As previously noted, this reflective means comprises a membrane light modulator of the type described and claimed in the aforementioned Preston patents. The specific construction used in the present invention comprises a thin layer or membrane 14 of a metal such as aluminum suspended over a cavity 15 defined by walls 16 which are mounted on a substrate 17. The walls 16 and substrate 17 may be of any suitable insulating material such as glass. The bottom of cavity 15 is covered with a conductive layer 18, for example, of copper, and a wire 19 is provided through substrate 17 to allow connection of the conductive layer 18 to a potential source. Any suitable voltage source, illustrated by battery 20, is connected between the reflective membrane 14 and the conductive layer 18 via wire 19. A potentiometer 21 is also provided in series with the battery. This potentiometer is a schematic representation of the control means which is used to vary the potential difference between the reflective membrane 14 and the conductive layer 18. The function of the membrane light modulator is to produce a variable deflection of the reflective membrane 14 according to the amount of voltage which is applied between the membrane and the conductive layer 18. That is, the membrane is sufficiently thin, on the order of 0.1 micron, so that the application of a potential difference on the order of 50 volts between it and the bottom of the cavity causes deflection by means of electrostatic attraction. The amount of deflection obtained is, of course, controlled by means of the applied voltage. In general this may range from 10 to 100 volts. The exact cavity dimensions depend on the size of the optical system. In general, the cavity and membrane arrangement described will function as desired for any size ranging from 1 or 2 microns between the walls up to 1 millimeter.

The deflection of the membrane 14 by application of the electrical potential changes the optical path length of the incident beam. Thus, the phase of those portions of the beam which have had to travel a longer distance are changed relative to their phase when the membrane is in the undeflected condition. This invention is based on the discovery that focusing the reflected beam by means such as lens 22 so as to form the Fraunhofer diffraction pattern, in combination with an appropriate spatial filter, such as an aperture 23, produces a maximized output for the undeflected position of the membrane and a zero output for an appropriate amount of membrane deflection. In particular, focusing of the beam reflected from the undeflected membrane produces a pattern of light amplitude which is illustrated in FIG. 2a. As is illustrated therein, most of the light is concentrated in a central spot which is surrounded by rings of substantially lower amplitude. In accord with this invention, when the membrane is deflected so that the center of the membrane moves a distance equal to one-fourth of the wavelength of the incident radiation, the focused beam contains light rays of varying phase which interfere to produce the pattern illustrated in FIG. 2b. Thus, the region of maximum intensity in FIG. 2a is converted to a region of zero intensity in FIG. 2b in the focal plane of the lens. Thus, by placing a spatial filter such as an aperture at the focal point of the lens, the aperture being sized so as to pass only the essentially zero region of the FIG. 2b pattern while blocking the remainder of the light, an output beam is achieved which is either maximum or zero for the undeflected and fully deflected positions of the membrane. By controlling the voltage applied between the membrane 14 and the conductive layer 18, the intensity of the output beam can thus be controlled. In order to provide a sufficient difference in intensity while passing the maximum light in the undeflected position, the aperture 23 should be of a size selected in relation to the pattern of FIG. 2b. This size is preferably on the order of $\lambda D/4f$ where $\lambda$ is the wavelength of the radiation, $D$ is the illuminated diameter of the lens and $f$ is the focal length of the lens.

FIG. 3 illustrates an alternative arrangement of the system of the present invention wherein the energy loss caused by the necessity of using the beam splitter of FIG. 1 is avoided. In this embodiment, the incident beam 11 is directed onto the membrane 14 at a slight angle, for example about 10° or less. The reflected beam then separates from the incident beam and the focusing lens 22 is located a sufficient distance from the membrane so that it does not interfere with the incoming beam 11. In this case, the patterns obtained are somewhat different from the circular patterns of FIG. 1 due to the angle of incidence of the beam at the membrane; however, as long as the angle of incidence is made sufficiently small, these differences are not significant.

Figure 4:
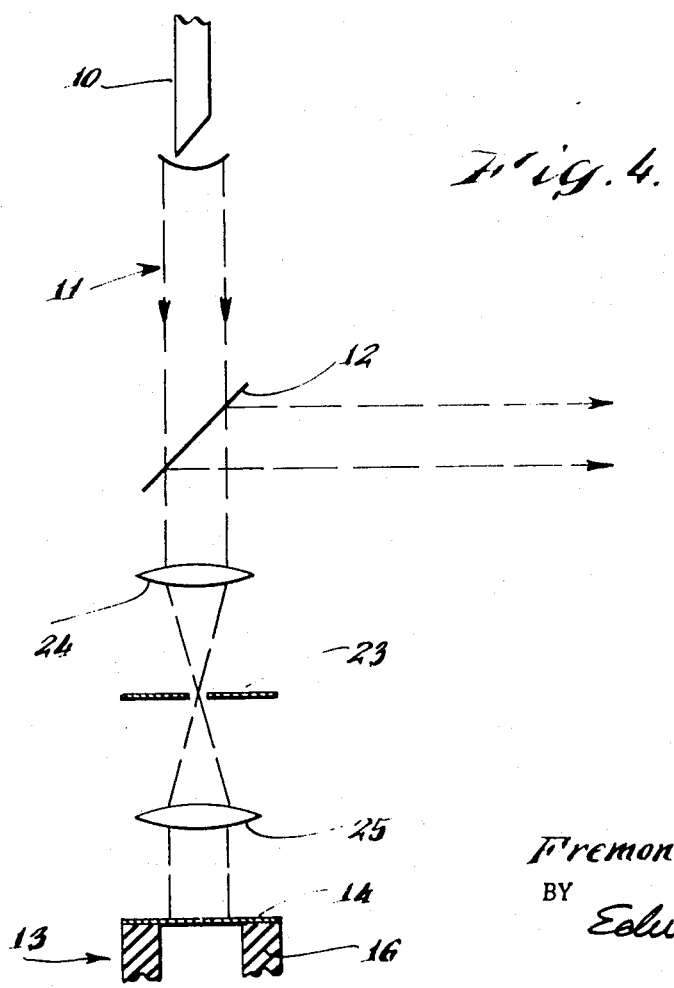
FIG. 4 is a vertical cross-sectional view of an alternative embodiment of this invention.

FIG. 4 represents an alternative embodiment which more conveniently provides for defining the beam which is applied to the modulator. In this embodiment, the beam 11 is applied through the beam splitter 12, to a focusing lens 24 and the aperture 23 is positioned at the focal point of lens 24. Lens 25 collimates the beam after which it is reflected from membrane 14 of a modulator 13. The reflected beam is now focused by lens 25 which forms the Fraunhofer diffraction pattern and aperture 23 functions in the same manner as previously described to provide an output beam, the intensity of which depends on the position of the membrane 14. The output beam is collimated by lens 24 and separated from the input beam by beam splitter 12.

While several embodiments of this invention have been illustrated and described, it will be apparent to those skilled in the art that many changes and modifications may be made without departing from the broad aspects of the invention. It is therefore intended that the appended claims cover all such changes and modifications as fall within the true spirit and scope of the invention.

I claim:

1. A light-modulating system for controlling the intensity of an output beam of radiation comprising:
    a source of radiation to be modulated;
    means for modulating radiation from said source comprising a movable electrically conductive reflective member spaced from an electrical conductor;
    means for applying an electric potential between said member and said conductor to control the deflection of said member;
    lens means positioned to form a Fraunhofer diffraction pattern of a beam reflected from said member and to focus the beam from the undeflected member into a central spot of maximum intensity surrounded by rings of lower intensity; and
    spatial filter means at the focal point of the lens means for transmitting the central portion of a focused beam reflected from the member,
    said spatial means being dimensioned for passing the central zero region of the reflected beam that forms when the center of the member is deflected a distance equal to one-fourth of the wavelength of the radiation incident on the member and blocking the surrounding portions of the beam.

2. A light-modulating system as claimed in claim 1 wherein said modulating means comprises a cavity covered by said reflective member and wherein said electric potential is applied between said member and the bottom of said cavity.

3. A light-modulating system as claimed in claim 2 wherein means are provided for controlling the potential applied across said cavity to control the amount of deflection of said member.

4. A light-modulating system as claimed in claim 1 and further including means comprising a beam splitter for directing radiation from said source onto said reflective member.

5. A light-modulating system as claimed in claim 1 wherein said source is disposed at an angle of between 80° and 100° to said modulating means.

6. A light-modulating system as claimed in claim 1 wherein said spatial filter comprises an aperture having a diameter on the order of $\lambda D/4f$ where $\lambda$ is the wavelength of the incident radiation, $D$ is the illuminated diameter of the lens and $f$ is the focal length of the lens.

7. A light-modulating system as claimed in claim 1 wherein said focusing means comprises a convex lens.

* * * * *